United States Patent [19]
Lemelson

[11] 3,750,804

[45] Aug. 7, 1973

[54] LOAD HANDLING MECHANISM AND AUTOMATIC STORAGE SYSTEM

[75] Inventor: Jerome H. Lemelson, Metuchen, N.J.

[73] Assignee: The Triax Company, Cleveland, Ohio

[22] Filed: Mar. 22, 1972

[21] Appl. No.: 237,188

Related U.S. Application Data

[63] Continuation-in-part of Ser. No. 805,315, March 7, 1969, Pat. No. 3,674,159.

[52] U.S. Cl. .......................... 214/16.4 A, 214/1 BT
[51] Int. Cl. ............................................. B65g 1/06
[58] Field of Search ............... 214/16.4 A, 16.1 DB, 214/16.1 D, 730, 650 SG, 75

[56] References Cited
UNITED STATES PATENTS

| | | | |
|---|---|---|---|
| 2,899,086 | 8/1959 | Saint-Andre | 214/16.4 A |
| 3,076,566 | 2/1963 | Dennis | 214/16.4 A |
| 3,292,804 | 12/1966 | Veneman | 214/730 |
| 3,351,219 | 11/1967 | Ruderfer | 214/16.4 A |

Primary Examiner—Gerald M. Forlenza
Assistant Examiner—R. B. Johnson
Attorney—George S. Baldwin et al.

[57] ABSTRACT

A warehousing system comprising a storage rack for storing loads thereon and a stacker crane movable alongside of the rack for depositing loads into and removing loads from selected storage locations in the storage rack. The stacker crane includes a load handling portion comprising a conveyor including power means for operating the conveyor. The conveyor may move a load from a selected storage location in the storage rack onto one end thereof, and then by powered operation of the conveyor, the load can be moved lengthwise of the load handling portion to a storage position on the latter, and then the conveyor can operate to pickup another load from a selected storage location and move it along the load handling portion and so on. In certain embodiments, transfer means mounted on the storage rack coact between the load handling portion and the storage rack for aiding in transferring loads between the latter. Certain embodiments of the disclosed warehousing systems include a powered load manipulator mechanism for transferring a load between the load handling portion and the storage rack.

24 Claims, 22 Drawing Figures

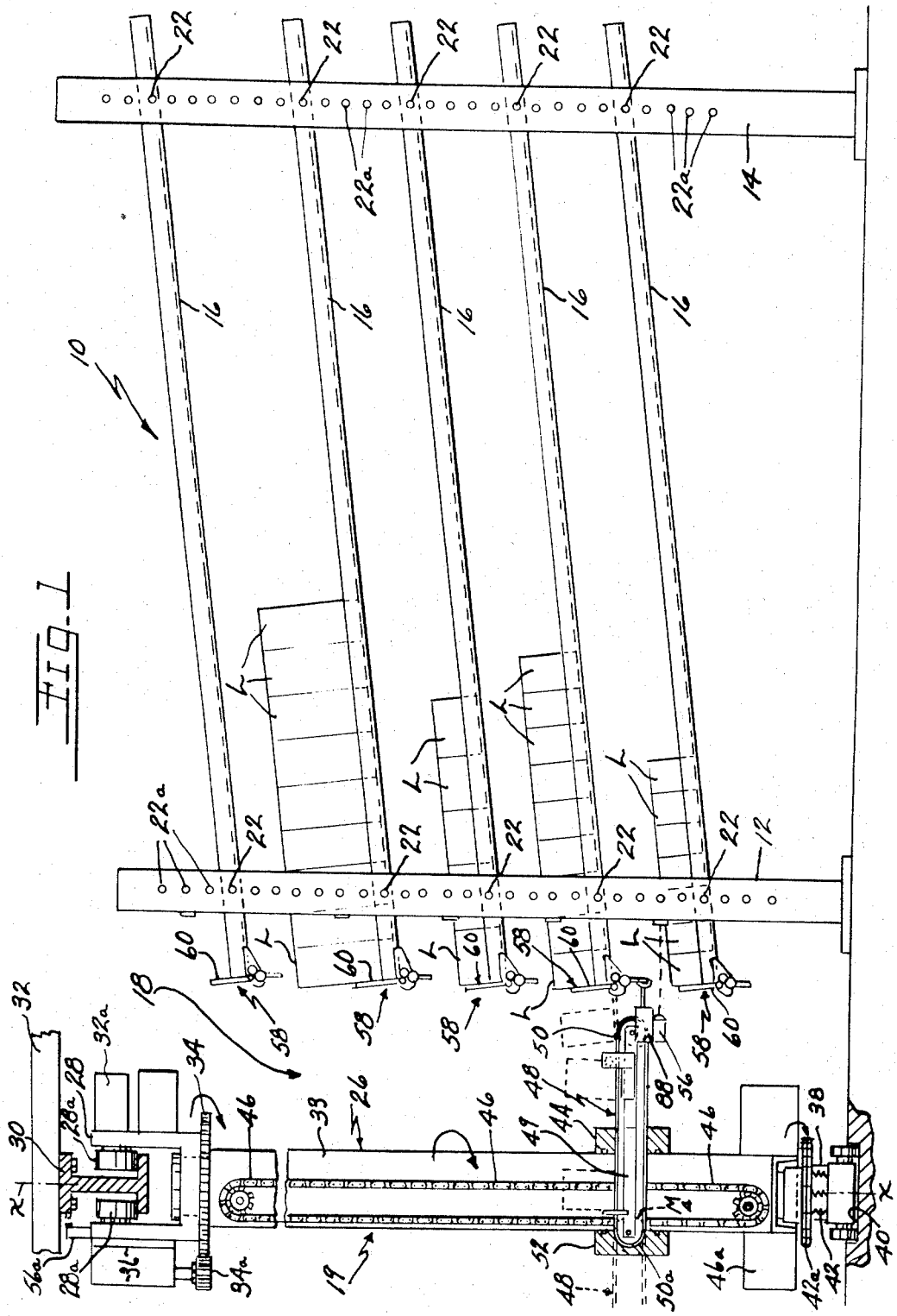

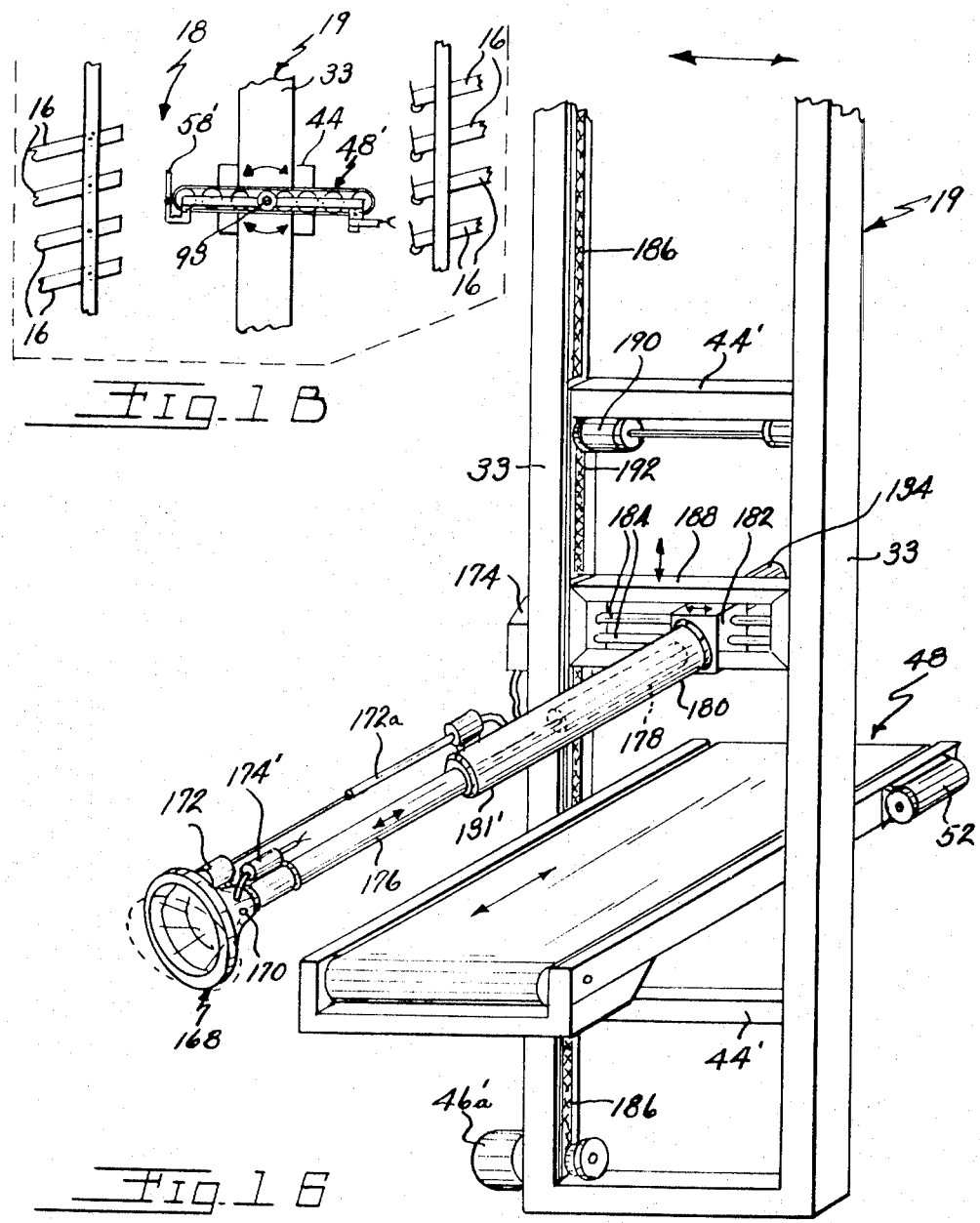

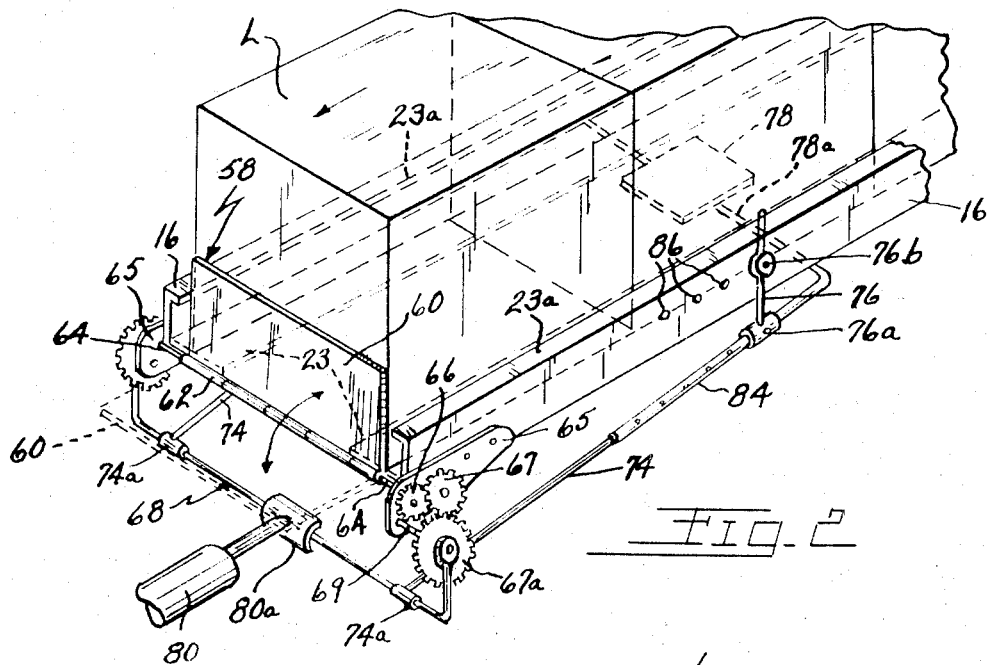
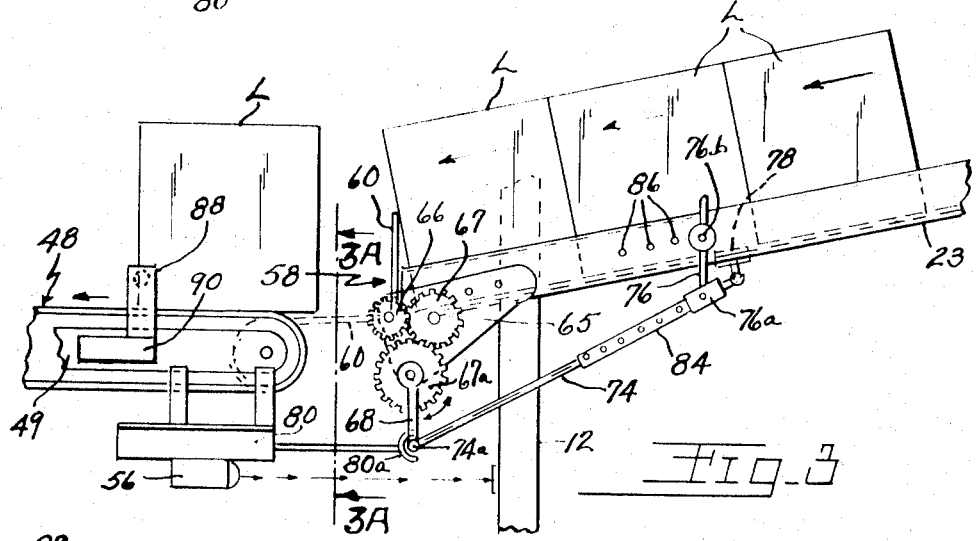
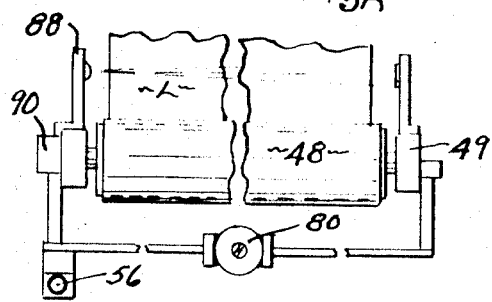

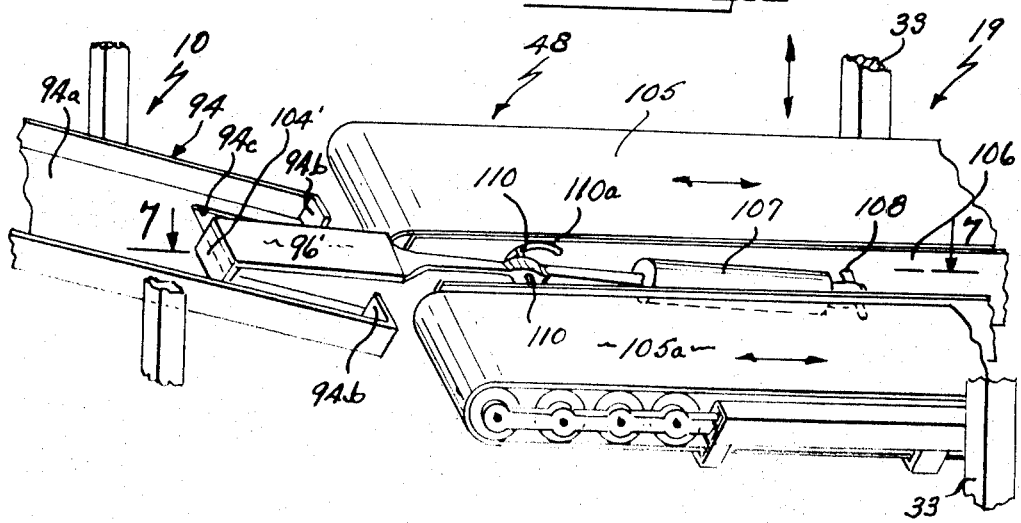
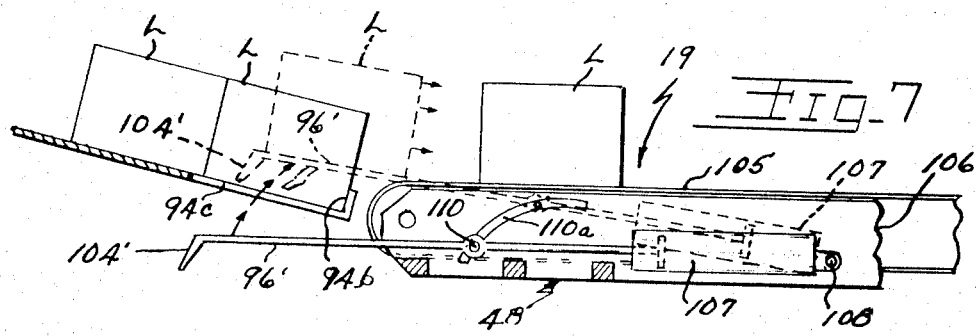
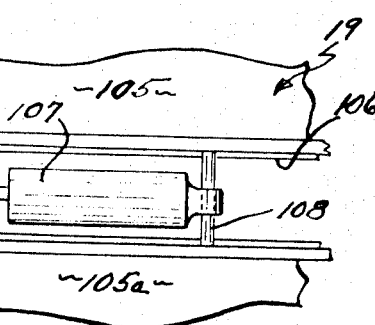

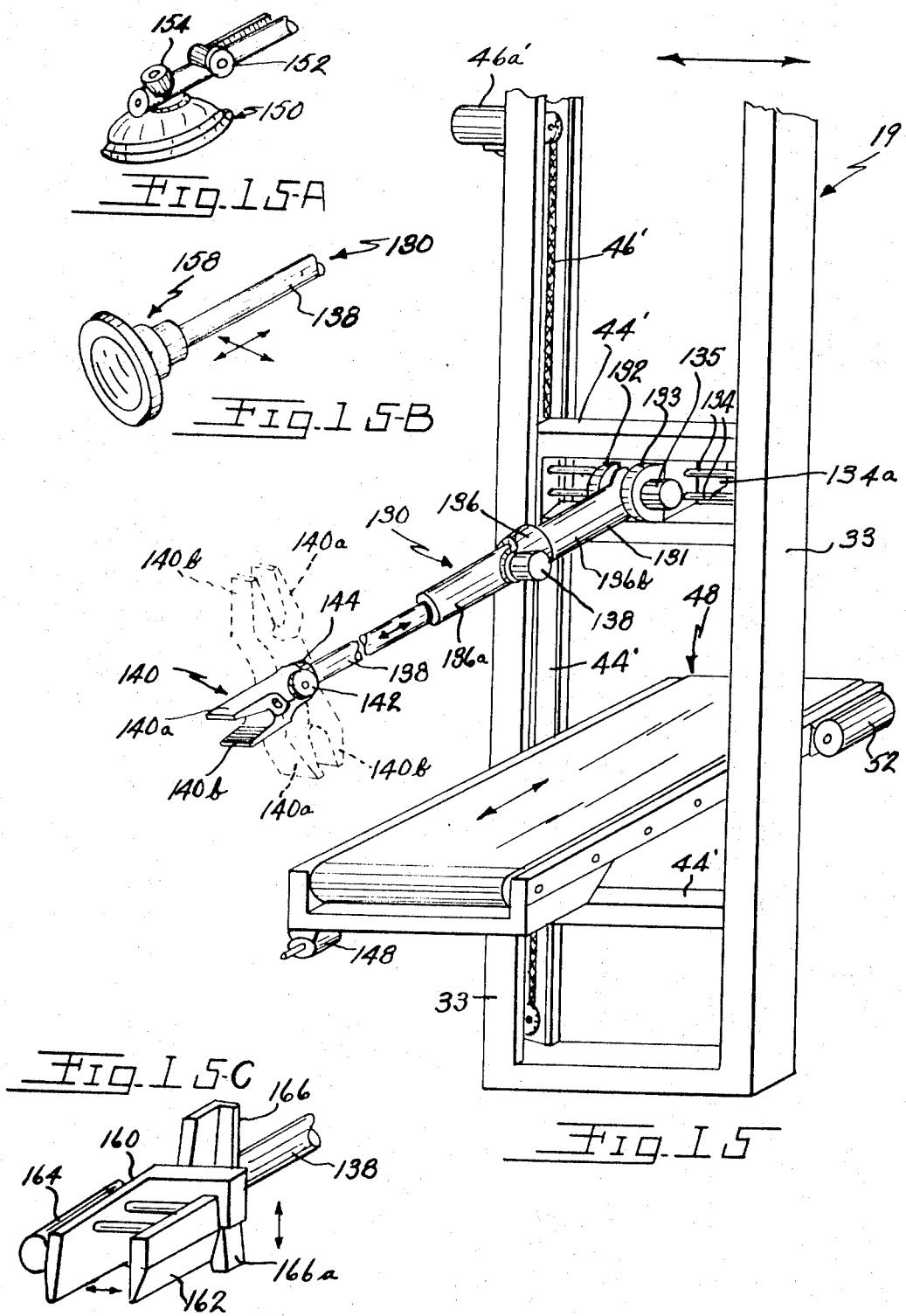

LOAD HANDLING MECHANISM AND AUTOMATIC STORAGE SYSTEM

This is a divisional patent application of the copending patent application Ser. No. 805,315 filed Mar. 7, 1969 in the name of Jerome H. Lemelson, now U.S. Pat. No. 3,674,159 issued July 4, 1972, and entitled Load Handling Mechanism and Automatic Storage System.

This invention relates in general to a warehousing system including a mechanized load carrier or stacker crane for depositing loads into and withdrawing loads from the storage structure of the warehousing system, and more particularly relates to a warehousing system wherein the stacker crane has a load handling conveyor portion which is adapted for coaction with the storage structure, for handling loads at selected storage locations in the storage structure, and wherein the conveyor portion can operate to pickup a load from the storage structure and move it lengthwise of the conveyor portion on the stacker crane and then operate to pickup another load from the storage structure and move it lengthwise on the conveyor portion, or vice versa, prior to movement of the stacker crane back to its beginning position, thus providing for warehousing functions not capable of being performed by conventional stacker crane apparatus. The storage structure may comprise storage racks which automatically feed loads in the direction of the stacker crane, such as for instance by means of gravity or powered conveyor means.

BACKGROUND OF THE INVENTION

In the copending U. S. Pat. application of Jerome H. Lemelson, filed July 15, 1968, Ser. No. 744,934, now U. S. Pat. No. 3,520,424 dated July 14, 1970, which is a divisional application of Ser. No. 468,532, filed June 30, 1965, now U. S. Pat. No. 3,474,919 dated Oct. 28, 1969, which in turn is a continuation of Ser. No. 219,357, filed Aug. 13, 1962 (now abandoned) which in turn was a continuation-in-part application of Ser. No. 577,415, filed Apr. 10, 1956, which in turn was a continuation-in-part application of Ser. No. 449,874 filed July 28, 1954, there is disclosed an automatic warehousing system wherein the storage volumes or storage racks comprise inclined passageways or conveyor means adapted to receive loads at one face thereof and discharge loads at the opposite face thereof, with the loads moving downwardly along the passageways from said one face to the other face, whereby a load carrier can deposit loads at said one face and remove loads from the selected passageway at said other face.

SUMMARY OF THE INVENTION

The present invention provides a warehousing system which may include the aforedescribed inclined storage racks, or conveyorized storage racks, for moving loads toward the travel zone in which the motorized stacker crane operates, and wherein the stacker crane comprises a powered conveyor portion which is adapted to coact in endwise fashion with selected storage locations in the storage rack, for handling loads thereat, either depositing a load or loads in the storage rack or removing a load or loads therefrom, and whereby a load can be moved onto the conveyor portion and moved lengthwise thereof while another load can be handled by the conveyor portion in line fashion, until the conveyor portion is loaded with the desired number and types of loads, after which the stacker crane can be moved back to its unloading position, such as a pickup and discharge station in the warehousing system. In some embodiments, the conveyor portion of the stacker crane may be shifted in its lengthwise direction for coaction with the storage racks. In other embodiments, transfer means are provided on the proximate end of the storage rack for facilitating transfer of loads between the conveyor portion and the storage rack. In certain embodiments, load manipulator means are provided on the stacker crane for selectively handling or picking up a load or loads, and moving it from the storage rack onto the conveyor portion of the stacker crane and vice versa.

Accordingly, it is an object of the invention to provide a novel warehousing system incorporating therein a novel stacker crane.

Another object of the invention is to provide a warehousing system of the aforediscussed type wherein the stacker crane includes manipulator means associated therewith, for gripping a load and bodily moving it between the conveyor portion and the storage rack and vice versa.

Another object of the invention is to provide a novel warehousing system including a storage and retrieval load carrier or stacker crane capable of handling loads of different shapes, and capable of "order picking" in the warehousing complex.

Another object of the invention is to provide a novel warehousing system of the aforedescribed type wherein the storage racks are of the automatic feed magazine type for automatically feeding loads in the direction of the travel zone for the stacker crane, and wherein transfer means are provided at the end of each of the storage rack magazines for aiding in transferring loads between the storage rack and the stacker crane, with the transfer means being actuated upon movement of the conveyor portion of the stacker crane into predetermined endwise alignment with the selected storage rack magazine.

Another object of the invention is to provide a novel material handling apparatus selectively movable in a travel zone and including a powered conveyor portion extending generally transverse of the travel zone for handling of one or more loads, and adapted for moving the loads lengthwise of the conveyor portion for storage thereon during load handling operations, and which includes load transfer means thereon coacting with said conveyor portion for facilitating the transfer of a load onto said conveyor portion.

Other objects and advantages of the invention will be apparent from the following description taken in conjunction with the accompanying drawings wherein:

FIG. 1 is an end elevational, diagrammatic illustration of a warehousing system embodying the present invention, and illustrating in phantom lines loads being transferred from a selected storage rack which is of the inclined gravity type, onto the transversely extending conveyor portion of the stacker crane, with such loads being moved lengthwise of the conveyor portion for further handling of loads by the conveyor portion;

FIG. 1A is a reduced size end elevational diagrammatic view of a warehousing system and associated stacker crane illustrating storage racks on both sides of the travel zone for handling of loads by the stacker crane in both storage racks;

FIG. 1B is a reduced size end elevational, diagrammatic view generally similar to FIG. 1, but illustrating the conveyor portion of the stacker crane being rotatable about a generally horizontal axis for tilting of the conveyor portion, and with the magazine chutes of one storage rack sloping away from the stacker travel zone, while the magazine chutes of the other storage rack slope toward the travel zone.

FIG. 2 is a diagrammatic, enlarged illustration of one of the storage locations or load magazines in the storage rack of FIG. 1, and showing in detail transfer means mounted at the discharge end of the storage location for facilitating transfer of a load from the storage rack onto the conveyor portion of the stacker crane, and illustrating the means on the stacker crane for actuating the transfer means to initiate the transfer operation of a load;

FIG. 3 is a fragmentary, side elevational view of the FIG. 2 mechanism, and showing the transfer means in phantom lines in position for transfering a load from the storage rack onto the powered conveyor portion of the stacker crane;

FIG. 3A is a fragmentary, broken view taken generally along the plane of line 3A—3A of FIG. 3 looking in the direction of the arrows;

Figure 4:
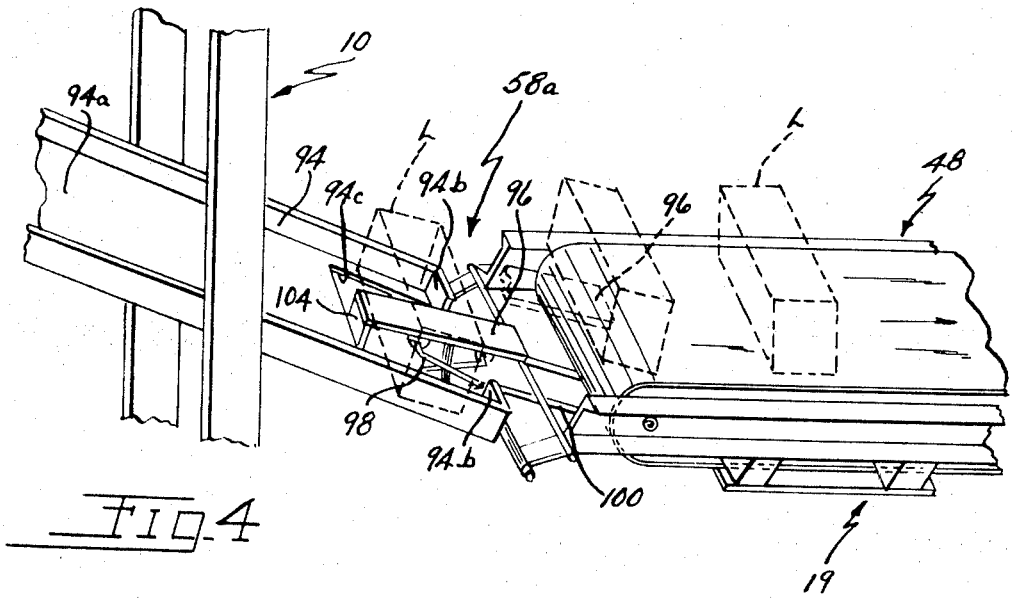
Figure 5:
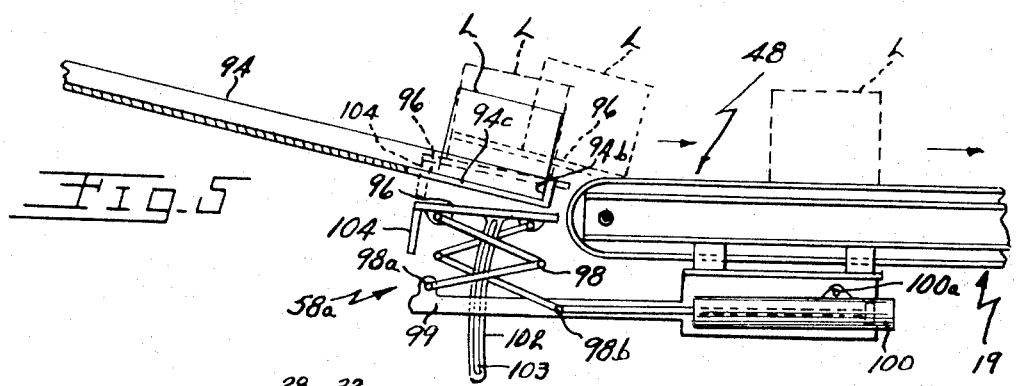
Figure 9:
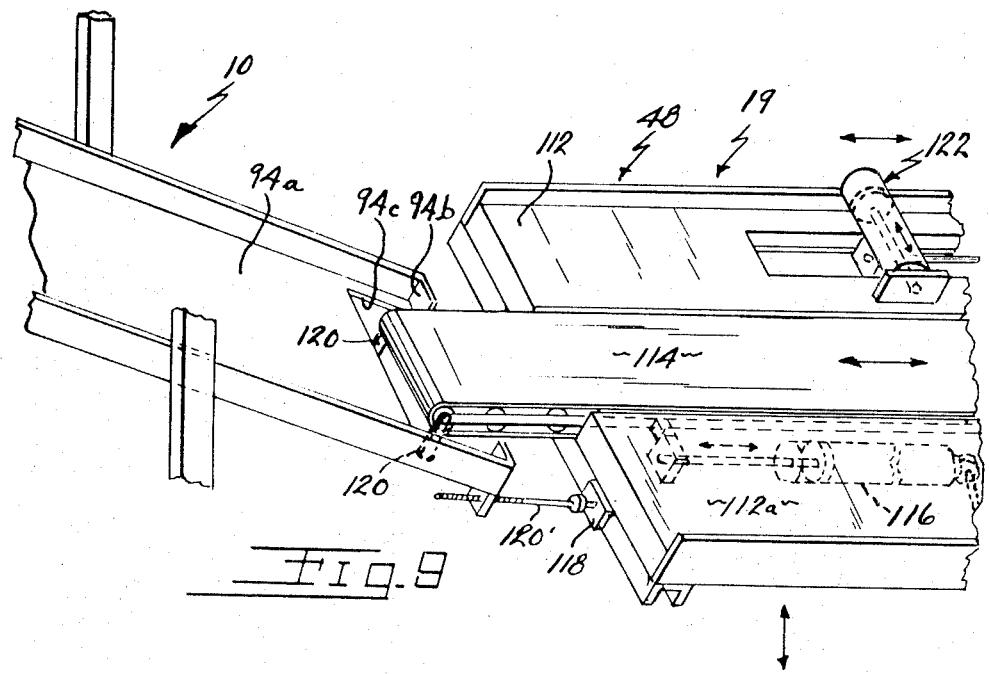
Figure 10:
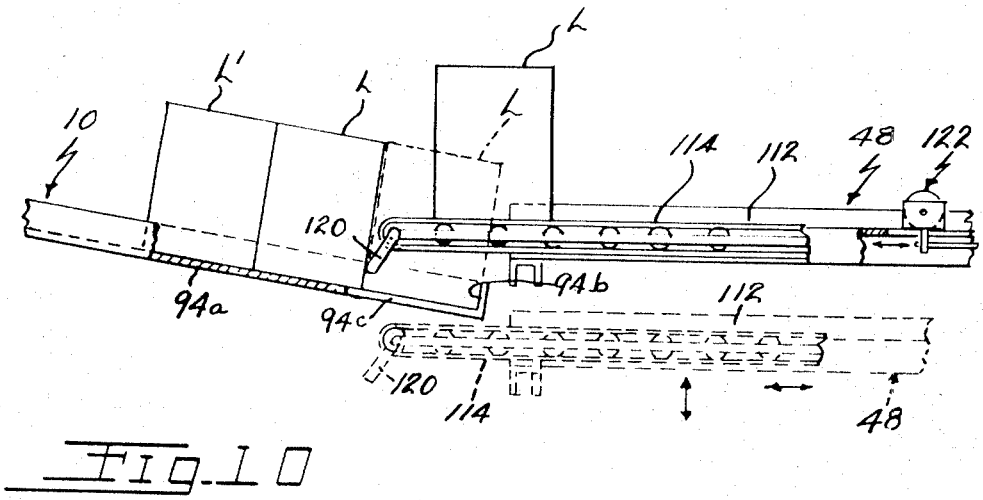
Figure 11:
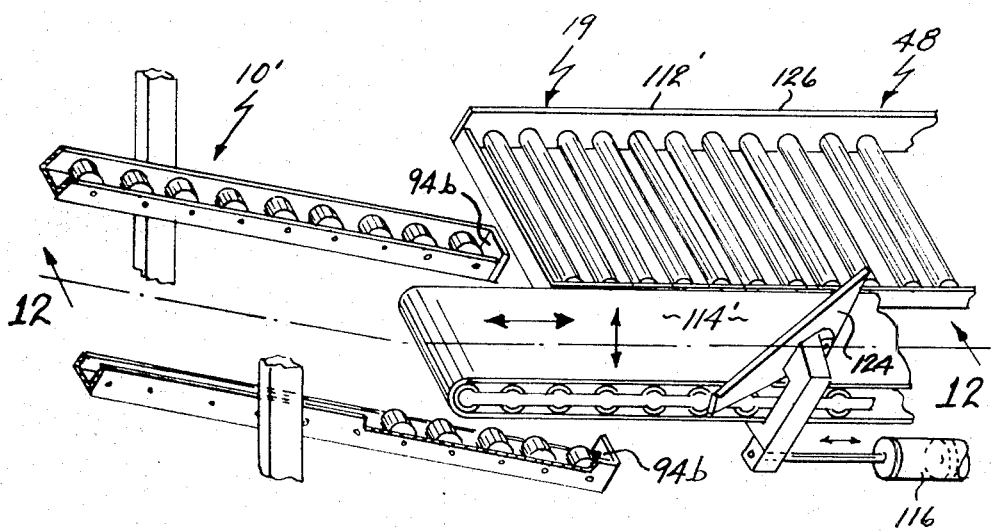
Figure 12:
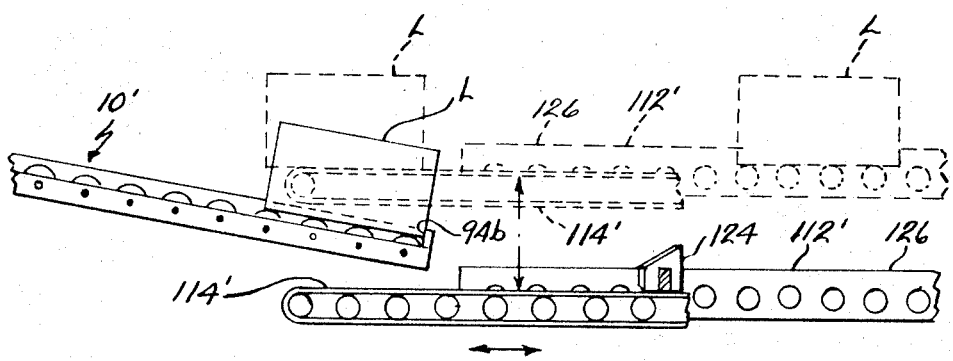
Figure 13:
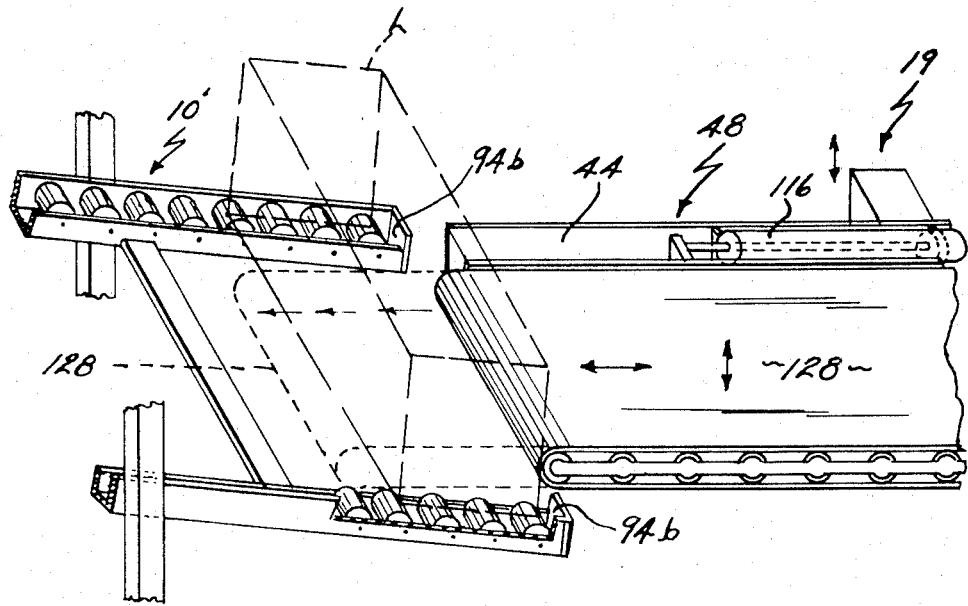
Figure 14:
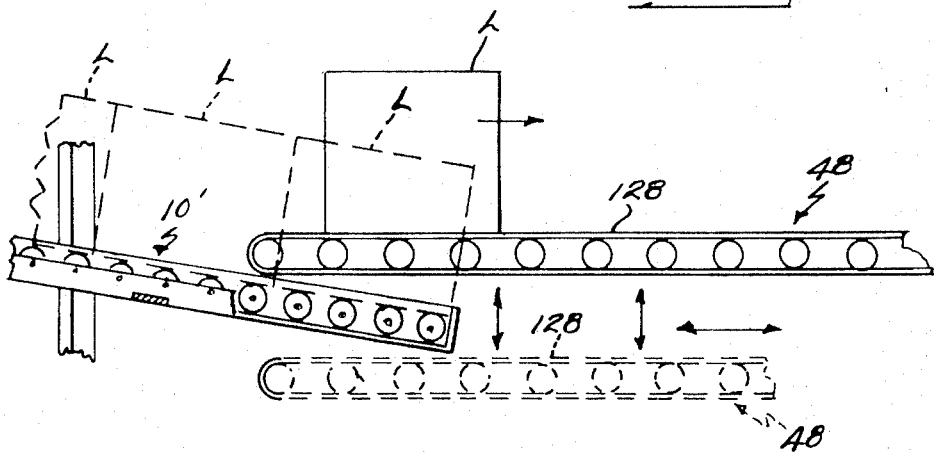

FIG. 4 is a fragmentary, perspective view of a modified form of transfer mechanism for transfering a load from the selected storage loaction in the storage rack onto the conveyor portion of the stacker crane, and with the transfer mechanism in this embodiment being mounted on the conveyor portion of the stacker crane and adapted for coaction with the magazine chute of the selected storage loaction, for moving a load upwardly and onto the conveyor portion;

FIG. 5 is a fragmentary, diagrammatic, side-elevational view of the FIG. 4 arrangement;

FIG. 6 is a diagrammatic, generally perspective fragmentary view of a further embodiment of transfer mechanism as mounted on the conveyor portion of the stacker crane, and coating with a selected storage chute or magazine in the storage rack, for transfering a load from the storage rack onto the conveyor portion of the stacker crane;

FIG. 7 is a fragmentary, side elevational view of the FIG. 6 arrangement;

FIG. 8 is a top-plan view of the FIGS. 6 and 7 mechanism;

FIG. 9 is a fragmentary, diagrammatic, perspective illustration of a further embodiment of conveyor portion of the stacker crane, utilizing an endwise shiftable endless belt conveyor section mounted on the conveyor portion for coaction with a slotted magazine chute of the storage rack, for moving loads from the storage rack onto the conveyor section and vice versa;

FIG. 10 is a fragmentary side-elevational view of the FIG. 9 mechanism, and illustrating the vertical movement of the conveyor portion and associated conveyor section, for lifting a load from the magazine chute of the storage rack, and moving it lengthwise of the conveyor section;

FIG. 11 is a generally diagrammatic, perspective, fragmentary illustration of a further embodiment of conveyor portion of the stacker crane coacting with a magazine chute of the storage rack, and embodying an endwise shiftable conveyor section disposed laterally of the main conveyor portion, so that a load can be moved from the storage chute onto the conveyor section for engagement with an abutment plate which shuttles it onto the main conveyor portion;

FIG. 12 is a fragmentary, diagrammatic, side-elevational view of the FIG. 11 embodiment, and illustrating in phantom lines the vertical movement of the conveyor portion of the stacker crane including the shiftable conveyor section, for lifting a load off the storage chute and moving it lengthwise of the conveyor section onto the main conveyor portion of the stacker crane;

FIGS. 13 and 14 are generally fragmentary, diagrammatic perspective and side illustrations of a further embodiment of the conveyor portion of the stacker crane wherein the conveyor portion incorporates an endless belt arrangement which is shiftable with respect to the vertically movable elevator portion of the stacker crane, and which can move into coaction with the magazine chute of the selected storage rack location and move a load from the chute onto the conveyor portion of the stacker crane;

FIG. 15 is a fragmentary, perspective, generally diagrammatic view of another embodiment of the stacker crane which includes a load manipulator mechanism mounted thereon, for gripping a load or loads and transferring the latter between the conveyor portion of the stacker crane and the selected storage rack;

FIG. 15A is a fragmentary perspective, generally diagrammatic view of a modified form of gripping head for the load manipulator shown in FIG. 15;

FIG. 15B is a fragmentary, perspective, generally diagrammatic view of a further embodiment of gripping head for use with the manipulator of FIG. 15;

FIG. 15C is a fragmentary, perspective, generally diagrammatic view of a further embodiment of gripping head for use with the manipulator mechanism illustrated in FIG. 15;

FIG. 16 is a fragmentary, perspective, generally diagrammatic view showing the stacker crane with a modified embodiment of manipulator mechanism mounted thereon for handling a load between the storage rack and the conveyor portion.

Referring now again to the drawings, the exemplary warehousing system illustrated comprises a warehousing storage structure 10 (FIG. 1) constructed in the embodiment illustrated of vertically oriented, laterally spaced, longitudinally extending rows of posts 12 and 14, which support thereon elongated load support members 16. Load support members 16, in the embodiment illustrated, are sloped downwardly in a direction toward a travel zone 18 in which a mechanized load carrier or stacker crane 19 is adapted for movement along the side of the storage rack, for handling loads at selected storage locations in the storage structure.

Figure 1A:
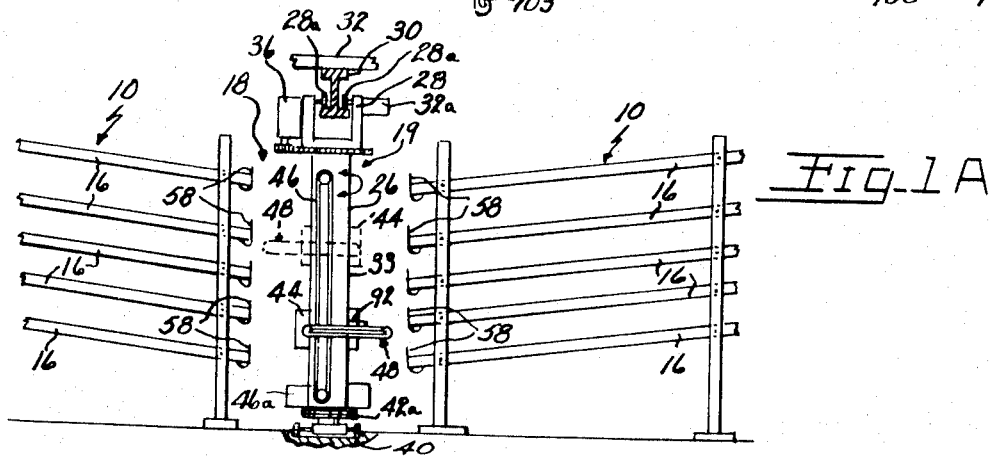

As can be seen in FIG. 1, the vertical posts are preferably provided with vertically adjustably laterally extending fastener means 22 which support the respective load support member. Holes 22a may be provided in the posts 12 and 14 for providing for the adjustment of the load support members. Each laterally aligned pair of the load support members may in conjunction define a chute or magazine structure for the storage rack, and in the FIG. 1 embodiment such magazine chutes are gravity actuated, so that loads L stored on the chutes automatically move by gravity down toward the discharge end of the respective chute, and in a direction toward the stacker crane travel zone. Thus when a load is removed from a selected gravity chute by the stacker crane, another load automatically takes its place due to the action of gravity. As can be best seen in FIGS. 3 and 4, each load support member 16 may comprise a channel-like member having a bottom support portion 23 on which the loads ride, and upright side portions and laterally inwardly extending guide portions 23a which guide the movement of the load down the respective chute. The loads are bridged between the opposing support members and may be supported on pallets or some other means, is so desired, or the loads themselves may merely bridge the support members in supported relationship for gravity feed toward the travel zone. While only one storage rack section is shown as being disposed along one side of the travel zone in FIG. 1, it will be understood that a similar storage rack with load support members sloping downwardly toward the travel zone may be readily provided on the other side of the travel zone, and as is shown, for instance, in FIG. 1A of the drawings.

As can be best seen in FIGS. 1, 1A, the load carrier or stacker crane 19 may comprise a longitudinally movable frame portion 26. The longitudinally movable portion 26 includes in the embodiment illustrated, a wheeled carriage portion 28 which is supported by means of the wheels 28a, on a longitudinally extending trackway 30 suspended from overhead support 32, thus providing for the aforesaid longitudinal movement of the stacker crane in the travel zone. Reversible electric motor 32a coupled to one of wheels 28a may provide the longitudinal drive for portion 26. Portion 26 may include vertical mast structure 33 which is preferably rotatable about a generally vertical axis X—X, and in this connection, may be provided with a gear 34 secured thereto which coacts with a pinion 34a which is drivingly coupled to a motor unit 36, such as a reversible electrical motor, supported on carriage portion 28 for rotating the pinion 34a, which thus rotates the gear 34 causing rotary movement of the mast structure 33 about the vertical axis X—X.

Portion 26 may also be provided with a wheeled carriage 38 which is movable longitudinally in recessed trackway 40, and which preferably includes suitable resilient load-absorbing means 42, such as coiled metal springs, hydraulic snubbers, or other suitable load supporting means, which coact with a support plate 42a on the lower end of the mast structure 33, for supporting a portion of the load being applied to the trackway 30. It will be seen that while the carriage 40 and its associated load supporting means 42 will operate effectively to support a generally vertical load applied thereto, that the mast structure 33 is still rotatable about generally vertical axis X—X and with respect to the lower carriage 38.

The stacker crane 19 also may include a vertically movable elevator portion 44 which is movable vertically on the mast structure 33, and which may be actuated in its vertical movement by means of an endless chain and coacting power driven sprocket arrangement 46 as illustrated in FIG. 1, or by any other suitable means, many of which are known in the prior art. Reversible electric motor 46a operably coupled to one of the sprockets may power the vertical movement of elevator portion 44.

Mounted on the elevator portion 44 is a load handling portion 48, which, in accordance with the invention, comprises a powered conveyor, such as, for instance, an endless belt conveyor, and which is operative to receive a load at one selected end thereof, and move the load lengthwise of the conveyor to a storage position thereon, thus clearing the loading end of the conveyor so that another load can be received on the loading end and moved lengthwise of the conveyor to a storage position thereon. As can be seen, the conveyor portion may comprise a supporting frame 49 and end drums 50, 50a, with preferably at least one of which being powered by motor unit 52, such as, for instance, a reversible electric motor.

The stacker crane may be controlled in its movement in the travel zone to selected load handling position or positions in the storage complex by means of an automatic control system such as, for instance, of the general type illustrated in U.S. Pat. No. 3,049,247 issued Aug. 14, 1962 to Jerome H. Lemelson and entitled "Automated Storage." In this connection the stacker crane may be provided with sensors such as, for instance, photoelectric sensors 56, 56a (FIG. 1) mounted thereon which are activated by means of actuators, such as reflectors mounted along the path of travel of the stacker crane as it moves in the travel zone, for automatically determining the position of the stacker crane with respect to the selected storage location and for automatically stopping the longitudinal and vertical movement of the stacker crane and initiate the automatic movement of the associated conveyor portion 48 to handle a load or loads at the selected storage location in the storage complex. Photoelectric means such as aforedescribed, is disclosed in detail in U.S. Pat. No. 3,119,501, issued Jan. 28, 1964 to Jerome H. Lemelson and entitled "Automatic Warehousing System".

Referring now to FIGS. 1, 2 and 3, there is illustrated in detail a transfer mechanism 58 associated with each discharge end of each magazine chute of the storage rack for holding the loads on the chute, and for facilitating movement of a load from the storage chute onto the conveyor portion of the stacker crane, when the conveyor portion of the stacker crane is disposed in confronting and properly positioned relationship with respect to the selected storage location in the storage complex. In the embodiment illustrated in FIGS. 2 and 3, such stop and transfer mechanism comprises a plate-like member 60, hinged as at 62 just below the plane of the load support portions 23 of the storage chute, and with such plate 60 being coupled to the hinge shaft 64 rotatably supported on brackets 65. Shaft 64 is secured to spaced drive gears 66 rotatably mounted on the respective bracket 65, which gears are meshed with respective gears 67, 67a rotatably mounted on associated bracket 65. Attached to gears 67a is a U-shaped actuating lever or bar 68 for rotating the gears, to thus cause downward pivotal movement of the transfer plate 60 against the resistance of spring means 70, the latter being operative to normally maintain plate 60 in load stopping position on the storage chute. A link frame 74 may be pivoted, as at 74a, to the actuator bar 68 and which is supported adjacent its distal end by means of hangers 76 which may be pivoted as at 76a to the frame 74 and pivoted as at 76b to the confronting side of the associated load support member. A retainer block 78 may be secured to the cross-piece 78a of frame 74, and it will be seen that upon inward pivotal movement of the trip bar 68, the frame 74 will swing inwardly about the pivot 76b to cause upward movement of the retainer block 78, and engage the overlying load, thus preventing the overlying load from moving down the associated storage rack chute during transfer of the forwardmost load on the chute load from the latter onto the conveyor portion 48 of the stacker crane.

As can be best seen in FIGS. 1, 2 and 3, the trip bar 68 is adapted to be actuated inwardly to cause downward pivotal movement of the stop plate 60 into a slightly downwardly tilted position (FIG. 3) whereby a load, due to the action of gravity, will move downwardly from the storage chute onto the plate 60 and thence onto the end of the conveyor portion of the stacker crane. Since the conveyor portion is power driven, and in the embodiment illustrated being an endless belt conveyor, all that is necessary is that the load coact with the rearwardly moving belt of the conveyor portion, whereupon the load will be moved lengthwise of the conveyor portion toward the opposite end of the conveyor portion. Actuation of the trip bar may be accomplished by means of solenoid 80 mounted on the acting end of the conveyor portion which, when the actuator thereof is extended, engages the trip bar by means of the coupling bracket 80a, and moves it inwardly. It will be seen that the aforementioned retainer 78 engaging the underside of the next-to-the-end load, prevents further movement of the loads down the inclined shute until such time as the transfer and stop plate 60 moves back toward its upright stop position, which occurs upon retraction of solenoid 80. It will be noted that the weight of the trip bar 68 and coacting retainer frame 74 aids in returning the plate 60 to its generally upright load retaining position. As can be best seen in FIGS. 2 and 3 the arms 84 of the retainer frame 74 are preferably adjustable in a lengthwise direction, so as to vary the position of the retainer 78, thereby providing for engagement of the retainer with different sizes of loads spaced along the storage rack chute, and openings 86 are provided in the side walls of the support members 16, for hanging the retainer frame at various positions thereon, upon adjustment of the length of the telescoping arms 84 of the retainer frame.

Referring now to FIG. 3A, there is illustrated scanning means, such as photocell scanners 88, that are adapted for sensing loads as they pass from the storage rack onto the conveyor portion of the stacker crane or vice versa, for actuating a recording means, such as for instance counter 90 for recording the number of loads that have been transferred between the conveyor portion and the storage rack. The recorder may be operatively coupled in circuit with the automatic control mechanism for the stacker cranes so that, upon recording of a predetermined number of loads as positioned on the conveyor portion, the stacker crane will automatically return to a discharge station, such as a pickup and discharge station (not shown) located at the entranceway to the travel zone, for automatically discharging the loads on the conveyor portion as sensed by the photocell sensors 88. Photocell sensors 88 may be located at both ends of the conveyor portion so that either end thereof would sense a load being received by the conveyor portion or being moved from the conveyor portion into the confronting storage rack.

Referring now to FIG. 1A, it will be seen that the stacker crane can service racks on opposite sides of the travel zone, by rotating the stacker crane about the aforementioned vertical axis X—X to position the conveyor portion of the stacker crane in confronting relation to the selected storage rack section. Moreover, the conveyor portion 48 may be so mounted on the elevator, that it is shiftable transversely of the elevator so that merely by actuating a motor unit, for instance a reversible electric motor unit 92 operatively secured to the conveyor portion, (and as by means of a conventional fluid pump and associated reciprocal fluid powered motor unit) the conveyor portion may be shifted from one side of the stacker crane to the opposite side thereof and thereby position the conveyor portion for handling loads at the opposite storage rack section. It will be understood of course that any suitable power means could be provided for shifting the conveyor portion as a unit from one side of the travel zone to the other side thereof, such as for instance a linear electric motor or a solenoid.

Referring to FIG. 1B, there is illustrated a stacker crane having a conveyor portion 48' mounted on elevator portion 44 for pivital movement about generally horizontal axis 93 for tipping movement with respect to the mast structure 33 of the stacker crane. In this embodiment, the load support members 16 defining the load storage chutes, in the storage rack on one side of the travel zone slope downwardly toward the latter, while the support members 16 in the rack on the opposite side of the travel zone slope downwardly away from the travel zone 18. Thus loading of the chutes in the left-hand rack may be readily accomplished upon proper positioning of the conveyor portion 48' in tilted relation to the selected chute, with gravity moving the load or loads from the conveyor portion into the storage chutes. Likewise it can be seen that loads may be moved form the storage rack on the right-hand side to the left-hand side storage rack via the tiltable conveyor portion 48'. Portion 48' may be power driven or could comprise an idler conveyor (such as an idler roller conveyor) which would actuate loads thereon only when tilted about pivot 93. The storage rack on the right may have transfer mechanism 58 associated therewith similarly to FIGS. 1–3, and also the left-hand end of conveyor portion 48' may have a transfer mechanism 58' mounted thereon, which could be similar to mechanism 58, for facilitating transfer of loads from conveyor portion 48' into the left-hand storage rack.

Referring now to FIGS. 4 and 5, there is shown a further embodiment of the stacker crane wherein the transfer mechanism 58a for transferring the load from the storage rack 10 onto the conveyor portion 48 of the stacker crane, is mounted on the active end of the conveyor portion rather than on the ends of each of the storage chutes of the storage rack. In this connection, each of the chutes 94 (only one of which is shown in FIG. 4) may have a continuous load supporting bottom wall 94a and may be provided at its discharge end thereof with abutments 94b adapted to engage the outermost load and retain it on the storage rack. A recessed portion 94c may be provided in each chute section, and the transfer mechanism 58a mounted on the active end of the conveyor portion includes a transfer platform or paddle portion 96 which is adapted to move through the recessed portion 94c during movement of the transfer mechanism from an inactive position, as shown in FIG. 5 wherein the top surface of the paddle portion 96 is disposed below the top surface of the conveyor portion, to an active position (as shown in FIG. 5 in phantom lines) wherein the top surface of the paddle portion 96 is disposed above the top surface of the conveyor portion.

The transfer mechanism 58a may include a lazy tong actuating linkage 98 which may be pivoted as at 98a at one side thereof to support 99 on the conveyor portion, with the other side of the linkage being pivoted as at 98b to a reciprocable motor unit 100 which may be movably mounted as at 100a on the conveyor frame. It will be seen upon outward extension of the power unit 100, the linkage 98 is extended to raise the paddle platform 96 upwardly through the recess 94c in the selected storage rack chute, to raise the load above the stops 94a and cause movement of the load toward the conveyor portion, whereupon the latter engages the load and moves it rearwardly along the lengthwise extent thereof. In the embodiment shown the conveyor portion is an endless power driven belt conveyor. In order to provide for gravity movement of the load from the paddle platform 96 into coaction with the power driven conveyor portion, there may be provided an arcuate link 102 attached to the platform 96 and coacting with the support 99 and the links of the linkage 98 by means of lugs received in the arcuate slot 103 of link 102, so that the platform 96 is tilted downwardly as shown in FIG. 5 during extension of the linkage 98 by motor unit 100. This causes the load supported on the platform to slide downwardly into coaction with the conveyor portion. A stop lug 104 may be provided on the loading end of the paddle platform 96 adapted for engagement with the upcoming load behind the load being handled by the platform 96, so as to prevent the upcoming load from interfering with movement of the handled load onto the conveyor portion.

Referring now to FIGS. 6, 7 and 8 there is shown a further embodiment wherein the conveyor portion comprises a pair of side-by-side endless belt conveyors 105, 105a, mounted on a common frame and separated from one another by means of a slotted base 106. A reciprocal type motor unit 107, which may comprise an electrical solenoid or a fluid powered motor unit may be disposed in the slot and pivoted as at 108 to the frame of the conveyor portion. A paddle-like platform 96' is coupled to the linearly reciprocable rod of the motor unit 107. The rod may include laterally projecting trunnions 110 which are received in arcuate cam slots 110a (FIGS. 6 and 7) formed in the frame of the conveyor portion. It will be seen that upon retraction of the rod of the motor unit from the position shown in FIG. 7, the paddle platform 96' is raised upwardly through the opening 94c in the selected storage rack chute, to cause lifting of a load from the selected storage rack and movement by gravity into coaction with the power driven, endless belt sections 105, 105a of the conveyor portion, for movement of the load lengthwise along the conveyor portion toward the other end thereof. It will be seen that the paddle platform 96' is of relatively narrow width so that the load being handled will engage and straddle the slotted area of the conveyor portion, and thereafter upon extension of the motor unit 107, the paddle platform 96' will be lowered down to inactive position below the top level of the conveyor portion. Stop lug 104' may be provided on lift paddle 96' similarly to the FIGS. 4 and 5 embodiment.

Referring now to FIGS. 9 and 10, there is shown a further embodiment of stacker crane and more particularly the conveyor portion 48 of the stacker crane, wherein the latter comprises storage areas 112, 112a disposed on opposite sides of a powered endless belt conveyor section 114. In this embodiment the conveyor section 114 is shiftable lengthwise with respect to the relatively stationary portions 112, 112a, and as by means of a reciprocable motor unit 116, which may be electrically or fluid powered. It will be seen that upon outward extension of the motor unit 116, the conveyor section 114 is projected forwardly from the associated ends of the storage sections 112, 112a. Upon retraction of the motor unit 116, the powered conveyor section 114 is moved inwardly of the storage sections 112, 112a and is adapted for movement to a position wherein the outer or active end thereof is substantially in alignment with the corresponding ends of the storage sections 112, 112a.

As can be seen in FIGS. 9 and 10, in the active or extended position of the conveyor section 114, the latter is adapted to move vertically from a lower inactive position wherein it is disposed below the level of the selected storage chute or rack, through the slot 94b in the chute, to lift the load upwardly above the chute, whereupon the powered conveyor section 114 moves the load lengthwise of the conveyor section 114 toward the opposite end thereof. This vertical movement of the conveyor portion is accomplished by the vertical movement of the elevator of the stacker crane, and this vertical movement may be controlled by the aforedescribed automatic control system, including for instance, a limit switch 118 (FIG. 9) mounted on the conveyor portion which is adapted for engagement with an adjustable actuator 120' mounted on the discharge end of the selected storage chute, for causing automatic movement of the elevator portion upwardly to lift a load off of the storage chute onto the conveyor section 114 when the conveyor section 114 has been extended and is in proper position below the selected storage chute. Forwardly projecting retainer or stop lugs 120 may be provided on the leading end of the conveyor section 114, for coaction with the upcoming load (as shown in FIG. 10) for preventing interference between the upcoming load and the vertical movement of the conveyor section 114 during handling of a load.

Mounted on one side of the relatively stationary storage sections 112 or 112a may be pusher mechanism 122 which is adapted upon actuation to move or push the load from the conveyor section 114 onto one of the stationary storage sections, thereby providing for storage of a considerable number of loads on the storage section. As illustrated in FIG. 9, the pusher may be power movable lengthwise along the side of the conveyor section 114, for coaction with a plurality of loads as they pass lengthwise along conveyor section 114. Pusher 122 may be electrically or fluid power operated, and may be coupled into the control circuit for the stacker crane, so that it operates automatically in predetermined sequence as a load moves into alignment with the pusher mechanism.

Referring now to FIGS. 11 and 12, there is illustrated a further embodiment of stacker crane wherein a conveyor section 114', which is preferably a powered endless belt conveyor, is disposed laterally of a relatively stationary conveyor section 112' of the conveyor portion of the stacker crane. Stationary conveyor section 112' may be of a roller type of construction, and it will be seen that upon lifting of a load off of the selected storage chute of the storage rack 10', the load will be moved lengthwise along powered conveyor section 114' until it engages deflector plate 124, whereupon the load is directed onto the roller section 112' and may then move therealong due to its momentum or due to power driving of the rollers of conveyor section 112'. Here again, the powered conveyor section 114' is adapted to be shifted as a unit lengthwise thereof, as by means of reciprocable motor unit 116, so that when the latter is in an extended position, it can move through the storage chute and remove a load therefrom. The storage chute in the embodiment illustrated is of the idler roller type, so that the load supported on the chute will move by gravity on the rollers down into engagement with the stops 94b. As can be seen in FIGS. 11 and 12 the relatively stationary roller section 112' of the conveyor portion has an upstanding lip or shoulder 126 on the outer side thereof, for preventing loads from inadvertently moving off the section 112' while the inner side of the roller section 112' is substantially flush in a horizontal plane with the top surface of the belt of conveyor section 114' for ready transferrence of loads therebetween.

Referring now to FIGS. 13 and 14, there is shown another embodiment of conveyor portion for the stacker crane, wherein the conveyor portion comprises a shallow (minimum thickness) endless belt conveyor 128 which may be power driven at one end thereof by any suitable power means, such as a reversible electric motor, and which conveyor is shiftably mounted on the elevator support for shifting movement by means of motor unit 116, in a direction lengthwise of the conveyor portion and transversely with respect to the elevator support, so that the conveyor 128 can extend beneath a load disposed on the discharge end of the selected storage rack chute. Thereafter the elevator and associated conveyor 128 may be moved vertically upwardly to move the load from the chute onto the conveyor 128, whereupon the load can be moved lengthwise of the conveyor for storage thereon preparatory to handling of other loads by the conveyor portion of the stacker crane. Here again the storage chute illustrated comprises spaced load support members having idler rollers thereon, for gravity movement of the loads down along the chute into engagement with the stops 94b. It will be understood that while the storage chutes illustrated in FIGS. 1 through 14 comprise a gravity type of chute, that the stacker crane illustrated could be readily used with other types of storage frames or racks, such as the conventional horizonal type of storage load support frame or a power conveyor type of storage rack could be used to assist in moving loads between the storage rack and the conveyor portion of the stacker crane.

The conveyor portion 128 in the FIGS. 13, 14 embodiment could be tilted with respect to the horizontal, instead of being horizontal as illustrated, for gravity movement of a load or loads thereon toward the lower end of the tilted conveyor portion. In this connection such conveyor portion could be an idler roller-type conveyor or merely a gravity chute with some suitable type of stop means at the lower end thereof for suitably stopping or retaining the loads thereon. The lower end of such tilted conveyor portion might also have a transfer mechanism associated therewith which could be similar to aforementioned mechanism 58' of the FIG. 1B embodiment. This principal of a gravity feed stacker conveyor portion or platform could also, of course, be applied to other of the stacker embodiments.

Referring now to FIG. 15, there is illustrated a further embodiment wherein the stacker crane 19 includes a load manipulator mechanism 130 mounted on the stacker crane, and more particularly on the elevator portion 44' thereof, for vertical movement with the conveyor portion 48 of the stacker crane. Elevator frame 44' may be guided in its vertical movement by mast structure 33, and motor 46a' and coacting sprocket and chain arrangement 46' may operate to move the elevator and associated mechanism vertically with respect to mast structure 33 of the longitudinally movable stacker crane. This arrangement may be especially advantageous in connection with order picking operations in a warehousing system wherein it is desired to order pick articles or small loads and the like which are stored in a storage rack disposed along the travel zone for the stacker crane. The conveyor portion 48 may be shiftable as a unit with respect to the elevator portion 44', similarly to for instance the FIGS. 13 and 14 embodiment.

The manipulator, in the embodiment illustrated, comprises an elongated jointed arm 131 which may be pivoted as at 132 to base portion 133 which in turn is movable transversely on track 134 and as by means of reversible drive motor 134a. Arm 131 is adapted for pivotal movement in a generally vertical plane, and as by means of a motor unit 135 (which may be a reversible electric motor unit) operatively coupled to the arm pivot 132. Preferably the arm also includes a pivotal joint 136 for pivotal movement of the forward portion 136a of the arm with respect to the rearward portion 136b thereof, which joint 136 is preferably powered, as by means of an electric or fluid powered motor unit 138. Moreover, arm portion 136a preferably includes an extensible and retractable portion 138 powered by a preferably reciprocal motor unit (not shown) disposed interiorly of the arm portion 136a, for extension and retraction of portion 138 with respect to the remainder of the arm, thus providing for varying the range of the manipulator arm 131.

Mounted on the distal end of manipulator arm 131 may be a gripper mechanism 140, which in the embodiment illustrated in FIG. 15 comprises pivotal jaws 140a, 140b pivoted to arm section 138 as at 142 for movement of the gripper jaws both with respect to one another, and as a unit in a generally vertical plane. Jaws 140a, 140b are motorized, as means of motor unit 144 (which may be electric) for opening and closing movements of the jaws, and for movement of the jaws as a unit in a generally vertical plane as shown in phantom lines. It will be seen that the manipulator mechanism 130 may operate to lift a load from a storage rack location and place it on the motorized conveyor portion 48, for movement of the load to one or the other end of the conveyor portion and then the manipulator can operate to place further loads from the storage rack onto the conveyor portion for storage of a selected number of loads on the conveyor portion, whereupon the stacker crane can move to a discharge station whereat it can discharge the loads order picked by the manipulator mechanism. Likewise the manipulator mechanism can operate to transfer loads carried on the conveyor portion into selected storage locations in the storage rack structure.

The motor units 134, 135, 138, 144 for the manipulator mechanism may be automatically operated and controlled in predetermined sequence with the automatic operation and control of the stacker crane, and may be programmed in conjunction with programming the movement of the stacker crane to the selected storage location or locations, so that the entire operation of the manipulator mechanism is automatic in its order picking function.

A sensor 148 may be provided on the ends of the conveyor portion of the stacker crane, so that when the conveyor portion is so disposed in confronting predetermined relation with respect to the selected storage rack chute or storage location, the sensor 148 will be automatically actuated to initiate the previously programmed automatic movement of the manipulator to pick up the selected load. The sensor 148 may be mechanically actuated by an actuator on the storage rack similar to that of FIG. 9, or may be actuated by any other suitable arrangement, such as for instance an energy beam.

Referring now to FIG. 15A, there is illustrated another embodiment of gripper means adapted for attachment to the outer end of the manipulator arm 131 illustrated in FIG. 15. Such gripper means in the embodiment illustrated in FIG. 15A comprises a suction gripper head 150 having a powered joint 152 for controlling the positioning of the suction gripper in a generally vertical plane. Suction may be automatically applied to and removed from the suction head 150 by means of automatic valve control 154 which may coupled by flexible conduit to a conventional source of suction mounted on the stacker crane.

FIG. 15B discloses a further suction unit 158 which may be mounted on the outer end of the arm 131 of the manipulator mechanism 130, for gripping a load or an article having a generally flat surface disposed in a generally vertical plane or in other words gripping a box from the side thereof, rather than from the top thereof. Means may be readily provided similar to that disclosed in FIG. 15A for automatically applying suction to and removing suction from the gripper head 159 of suction unit 158.

Referring now to FIG. 15C there is shown a further embodiment of gripper means, which comprises laterally spaced jaws 160, 162 which may be power operated for lineal movement of jaw 162 toward and away from jaw 160 as by means of a motor unit 164, for gripping and releasing objects handled by the manipulator mechanism. The jaws 160, 162 may be mounted for vertical movement on a guide 166 secured to the distal end of the manipulator arm section 138, and power means 166a may be provided for so moving the jaws 160, 162 as a unit vertically on guide 166.

Referring now to FIG. 16, there is illustrated another embodiment of stacker crane. In this embodiment, a suction head unit 168 generally similar to that shown in FIG. 15A is provided on the distal end of the manipulator arm 131' with the suction unit being pivotable in a generally vertical plane about pivot 170, for effectively gripping an object or load and moving it to and from conveyor portion 48 of the stacker crane. With such an arrangement, irregular shaped loads other than symmetrical or rectangular shaped boxes or loads can be readily handled by the manipulator mechanism. Valve means 172 can be provided connected by extensible conduit 172a to a source of suction 174 on the stacker crane, for applying suction to and removing suction from the gripper head, and a motor unit 174' may be provided operatively coupled to gripper head 168, for pivoting the gripper head about pivotal axis 170.

Manipulator arm 131' may comprise outer reciprocal portion 176 actuated by reciprocal motor unit 178 disposed interiorly of inner arm portion 180 which in turn is secured to base portion 182 mounted on guides 184, for transverse movement of manipulator arm 131' between mast structure 33. Motor unit 134 may power arm 131' for said transverse movement. Elevator frame 44' may be guided in its vertical movement by mast structure 33 and may be powered by chain and sprocket arrangement 186 for vertical movement, as driven by reversible motor unit 46a'. Elevator frame 44' supports conveyor portion 48 thereon, the latter preferably comprising an endless belt conveyor driven by reversible motor unit 52. Conveyor portion 48 may be shiftable as a unit in a direction lengthwise thereof, and as by means of a reciprocal power unit (not shown).

The aforementioned guide tracks 184 may be supported by frame 188 mounted for vertical movement with respect to elevator frame 44' and driven vertical as by means of reversible motor unit 190 supported on the elevator frame, and coacting chain and sprocket drive 192 connected to frame 188. It will be seen therefore that with such an arrangement the manipulator mechanism is movable vertically with respect to the conveyor portion 48. Frame 188 may be guided in its vertical movement by elevator frame 44'.

From the foregoing discussion and accompanying drawings it will be seen that the invention provides a novel warehousing system which includes a stacker crane movable alongside one or more storage racks in the sytem, for depositing loads into and removing loads from selected storage locations in the storage racks. The stacker crane includes a conveyor portion for moving a load from a selected storage location in the storage rack onto one end of the conveyor portion, and then by operation of the conveyor portion, the latter can move the load lengthwise of the conveyor portion for storage thereon, and operate to pick up another load from the storage racks and move it lengthwise of the conveyor portion and so on, all the while storing the received loads on the conveyor portion of the stacker crane. The invention also provides an arrangement wherein the conveyor portion may be shiftable as a unit lengthwise thereof for coaction with the selected storage location in the storage rack.

The invention also provides a stacker crane which includes manipulator mechanism associated therewith, for aiding in order picking loads from a storage rack and placing them on the conveyor portion and vice versa. Moreover, the invention provides a novel arrangement of strorage racks including in one embodiment transfer mechanism, which is operable by the stacker crane, for facilitating movement of loads from the storage racks onto the conveyor portion of the stacker crane.

I claim:

1. In a warehousing system including storage rack means having a plurality of storage locations therein opening onto a generally longitudinally extending travel zone and being adapted to store loads therein, and a stacker crane movable in said travel zone alongside said storage rack means for depositing loads into and removing loads from selected storage locations in said storage rack means, said stacker crane comprising a generally longitudinally movable portion adapted for movement lengthwise of said travel zone and a load handling generally horizontally oriented conveyor portion mounted on said longitudinally movable portion, power means coacting with said conveyor portion for driving the latter whereby a load can be moved from one end of said conveyor portion toward the other end thereof upon operation of said power means, and including load manipulator means mounted on said stacker crane for gripping a load and moving it bodily between said conveyor portion and said storage rack means.

2. A system in accordance with claim 1 wherein said stacker crane includes an elevator portion mounted on said longitudinally movable portion for vertical movement with respect thereto, said conveyor portion being supported by said elevator portion, power means for moving said elevator portion and supported conveyor portion vertically with respect to said longitudinally movable portion, and wherein said manipulator means is carried by said elevator portion for vertical movement therewith.

3. A system in accordance with claim 1 wherein said stacker crane includes an elevator portion mounted on said longitudinally movable portion for vertical movement with respect thereto, and means mounting said manipulator means thereon for selective movement of said manipulator means vertically and laterally relative to said elevator portion.

4. A system in accordance with claim 1 wherein said manipulator means comprises an extensible arm, means pivoting said arm to said stacker crane for movement in a generally vertical plane, and gripping means disposed adjacent the distal end of said arm for gripping a load.

5. A system in accordance with claim 1 wherein said manipulator means comprises an elongated arm movably mounted on said stacker crane, and a head adjacent the distal end of said arm, said head including means for gripping a load, and means for moving said head with respect to said arm.

6. A system in accordance with claim 4 wherein said gripping means comprises a suction gripper including means for selectively applying suction to and removing suction from said suction gripper.

7. A system in accordance with claim 1 wherein said manipulator means comprises an elongated arm, means pivotally mounting said arm to said stacker crane for movement in a generally vertical plane, said arm comprising a rearward section and a forward section, said forward section being pivoted to said rearward section for movement in a generally vertical plane with respect thereto, and said forward section including extensible means for selectively extending and retracting said forward section, and load gripper means mounted on the distal end of said forward section.

8. A system in accordance with claim 1 wherein at least certain of the storage locations in said storage rack include load support means for supporting loads thereon and automatically moving the loads in a direction toward said travel zone, for handling by said stacker crane.

9. A system in accordance with claim 1 wherein at least certain of said storage locations in said storage rack means include load support means for supporting loads thereon in tandem relation and automatically moving the loads in a direction toward said travel zone, for handling by said stacker crane, and movable load transfer means mounted on said storage rack and adapted when in predetermined operative position for coaction between said storage rack and said conveyor portion for providing support for moving a load from a selected one of said storage locations directly onto said conveyor portion.

10. A system in accordance with claim 5 including actuating means for movably actuating said transfer means to cause transfer of a load from the selected storage location in said storage rack onto said conveyor portion, and holding means coacting with said transfer means and actuated by said actuating means for preventing an upcoming load behind the handled load from interferring with movement of the handled load.

11. A storage rack for use in a warehousing system for storing a plurality of loads in a plurality of storage locations therein and adapted to be disposed along a travel zone in which a guided load handling mechanism is adapted for traveling for at least removing loads from the storage rack, said storage rack at at least certain of said storage locations including load support means for supporting loads thereon in tandem relation and automatically moving the loads in a direction toward the travel zone for handling of the loads by the load handling mechanism, and movable load transfer means mounted on said storage rack adjacent the discharge end of said load support means at each of said certain storage locations and operative in one position to retain the associated loads on said load support means and adapted for actuation to another position for providing a bridge for moving a load from the associated load support means onto the load handling mechanism, holding means coacting with said transfer means and actuatable to an active position during actuation of said transfer means to said other position wherein the holding means is adapted for holding coaction with an upcoming load behind the handled load on the associated load support means, for preventing the upcoming load from interferring with the movement of the handled load onto the load handling mechanism, said transfer means at each of said certain storage locations comprising a member pivotable about a generally horizontal axis and which when in said one position provides a generally vertically extending abutment to the confronting load and which when in said other position provides a substantially downwardly sloping connecting bridge between the respective load support means and the load handling mechanism.

12. A storage rack in accordance with claim 11 wherein said transfer means at each of said certain storage locations comprises a plate-like member pivotal about a generally horizontal axis, gear means operatively coupled to said plate-like member for causing pivotal movement thereof upon rotation of said gear means, and said holding means comprising a retainer block mounted on a movable framework operatively coupled to said gear means for moving the retainer block into holding engagement with the upcoming load to thus hold the latter in arrested condition on said load support means when said plate-like member has been swung downwardly to bridge the space between the load support means of the respective storage location and the load handling mechanism.

13. A storage rack in accordance with claim 12 including means swingably mounting said frame to the respective storage location and including means for adjusting the positional relationship of said frame to said load support means.

14. In a stacker crane adapted for handling loads, said stacker crane comprising a generally longitudinally movable portion and a conveyor portion mounted on the first mentioned portion and extending in a direction generally transverse of the longitudinal direction of movement of the first mentioned portion, power means for actuating said conveyor portion in a direction lengthwise thereof whereby loads moved onto said conveyor portion can be power moved in a direction lengthwise of the conveyor portion for moving a load from one end of said conveyor portion toward the other end of conveyor portion, so as to provide for the first mentioned end of the conveyor portion to receive another load, load manipulator means supported by said stacker crane and coacting with said conveyor portion for gripping a load and moving it from a predetermined location onto said conveyor portion, and for taking a load from said conveyor portion and moving it to another location.

15. A stacker crane in accordance with claim 14 including means for moving said conveyor portion vertically with respect to said first mentioned portion.

16. A stacker crane in accordance with claim 14 including power means for shifting said conveyor portion as a unit in a direction lengthwise thereof and in a direction transverse to the longitudinal direction of movement of said first mentioned portion.

17. A stacker crane in accordance with claim 14 including means for rotating said stacker crane about a generally vertical axis and through a range of at least 180°.

18. A stacker crane in accordance with claim 14 wherein said manipulator means includes an extensible arm and load gripping means mounted on said arm adjacent the distal end thereof.

19. A stacker crane in accordance with claim 18 wherein said arm is articulated.

20. A stacker crane in accordance with claim 14 including an elevator portion mounted on said longitudinally movable portion for vertical movement with respect thereto, said conveyor portion being supported by said elevator portion, power means for moving said elevator portion and supported conveyor portion vertically with respect to said longitudinally movable portion, said manipulator means being carried by said elevator portion for vertical movement therewith.

21. A stacker crane in accordance with claim 14 including an elevator portion mounted on said longitudinally movable portion for vertical movement with respect thereto, said conveyor portion being mounted on said elevator portion, and means mounting said manipulator means for selective movement of said manipulator means vertically and laterally relative to said elevator portion.

22. In a stacker crane adapted for handling loads, said stacker crane comprising a generally longitudinally movable portion and a conveyor portion mounted on the first mentioned portion and extending in a direction generally transverse of the longitudinal direction of movement of the first mentioned portion, power means for actuating said conveyor portion whereby loads moved onto said conveyor portion can be moved in a direction lengthwise of the conveyor portion for moving a load from one end of said conveyor portion toward the other end of conveyor portion, so as to provide for the first mentioned end of the conveyor portion to receive another load, and load manipulator means supported by said stacker crane and coacting with said conveyor portion for handling a load.

23. In a stacker crane adapted for handling loads to and from a storage rack, said stacker crane comprising a vertically elongated generally longitudinally movable portion, an elevator portion mounted on said longitudinally movable portion for vertical movement with respect thereto, said elevator portion mounting a powered support portion thereon for receiving loads in carried relation, power means for actuating said longitudinally movable portion, said elevator portion and said support portion, said support portion being movable in a direction generally transverse to the direction of movement of said longitudinally movable portion, load manipulator means supported by said stacker crane above said load support portion, said manipulator means including means for gripping a load and laterally moving it bodily between said support portion and a predetermined location and vice versa, and means mounting said manipulator means for movement generally horizontally and in a direction generally transverse of the direction of movement of said support portion.

24. A stacker crane in accordance with claim 23 wherein said manipulator means includes suction gripper means for gripping a load.

* * * * *